Patented Feb. 8, 1944

2,341,081

UNITED STATES PATENT OFFICE 2,341,081

COMPOUNDS OF THE CYCLOPENTANO-POLYHYDROPHENANTHRENE SERIES AND PROCESS FOR THE MANUFACTURE THEREOF

Adolf Butenandt, Berlin-Dahlem, Germany, assignor to Schering Corporation, Bloomfield, N. J., a corporation of New Jersey No Drawing. Application July 4, 1939, Serial No. 282,816. In Germany July 5, 1938

13 Claims. (Cl. 260—397.3)

This invention relates to compounds of the cyclopentano-polyhydrophenanthrene series and process for the manufacture thereof.

In application Serial No. 166,453 processes are described according to which 3-keto-methyl-cyclopentano-polyhydrophenanthrene compounds and their enol derivatives are converted by splitting off or displacement of the 10-methyl group into products aromaticised in ring A with follicle hormone-like properties. In this case compounds are started with, among others which contain in ring A two keto groups in ortho position and for example according to application Serial No. 145,052 from halogenated starting materials and these on their part can be obtained from unsaturated mono-ketones.

A new method has now been found for the conversion of $\alpha.\beta$-unsaturated 3-keto-10-methyl-cyclopentano-polyhydrophenanthrene compounds or their enol derivatives into nuclearly saturated polyhydroxy and polyoxo-compounds and, if desired, into follicle hormone-like products.

According to the invention such ketones or their enol derivatives are converted into di- and polyhydroxy compounds with saturation of the double bonds, the oxidation products obtained or their derivatives, such as esters, if desired being them converted with splitting off of water, acid or the like into unsaturated di- and poly-oxo compounds and the latter then aromaticised in ring A according to methods known per se by removal of the methyl group from the 10-position.

$\alpha.\beta$-Unsaturated ketones can in general only with difficulty be subjected to a careful oxidation which leads to the addition of oxygen or to the attachment of the elements of hydrogen peroxide to the double bond. As is known double bonds in adjacent position to a carbonyl or carboxyl group react extremely difficultly with perbenzoic acid; hydrogen peroxide does not attack $\alpha.\beta$-unsaturated ketones in neutral solution in the cold, while their treatment with hydrogen peroxide in alkaline solution frequently does not stop at the stage of the oxide. Also osmium tetroxide in ethereal solution is in general without effect on double bonds adjacent the carbonyl group, a fact of which use has already been made in the selective addition of hydroxyl groups to plurally unsaturated stereoid ketones.

The present invention concerns primarily a process for the simple production of polyhydroxy compounds of steroids which are derived from $\alpha.\beta$-unsaturated ketones by addition of hydrogen peroxide to the double bond adjacent the carbonyl group. According to the invention, the desired $\alpha.\beta$-dihydroxy-ketones can be produced even at room temperature from the unsaturated ketones if for this purpose a solution of hydrogen peroxide is employed in the presence of osmium tetroxide.

Particularly suitable are ethereal or benzene solutions of commercial hydrogen peroxide which only need contain small amounts (about $\frac{1}{10}$ to $\frac{1}{5}$ mol) of osmium tetroxide.

If for example $\Delta^4$-cholestenone (Ia) is treated at about 20° C. with 30% hydrogen peroxide in ethereal solution in the presence of some osmic acid, then in a surprising manner the elements of hydrogen peroxide are added to the double bond and there is obtained a cholestanone-(3)-diol-(4.5) (IIa), which on treatment with acetic anhydride in pyridine easily yields a 4-monoacetate. By a similar method of working there was obtained from $\Delta^1$-cholestenone (III) a cholestanone-(3)-diol-(1.2) (IV).

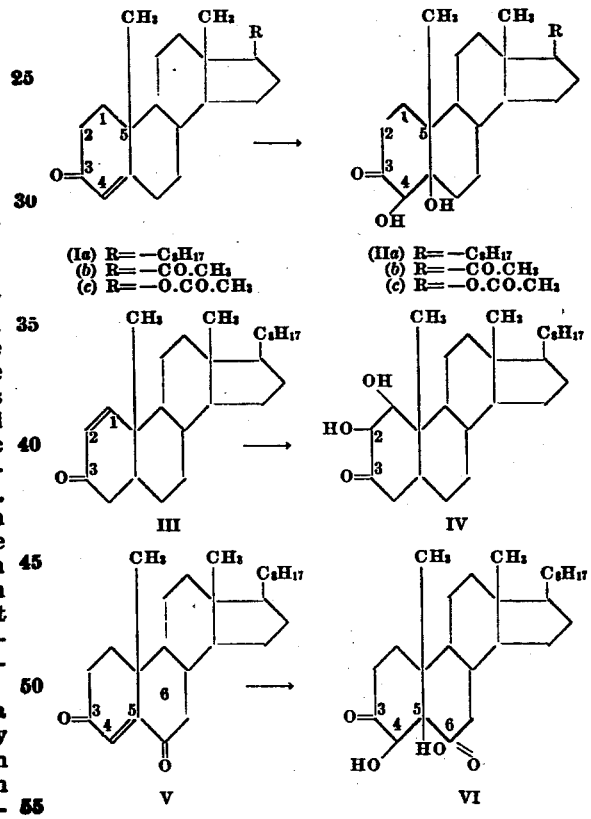

The addition of hydrogen peroxide can be carried out particularly smoothly to double bonds which are located between two carbonyl groups. Thus the $\Delta^4$-cholestendione-(3.6) (oxocholestenone, (V) yields on reaction with hydrogen peroxide in the presence of osmium tetroxide in quantitative yield a cholestandione-(3.6)-diol-(4.5) (VI).

In the same manner there were produced the 4.5-dihydroxy-derivatives of progesterone and testosterone. The pregnandione-(3.20)-diol-(4.5) (IIb) obtainable from progesterone (Ib) was obtained crystalline and characterised by a 4-mono-acetate; there were further obtained from testosterone acetate (Ic) the anrostanone-(3)-triol-(4.5.17)monoacetate-(17) (IIc) and a 4.17-diacetate.

The diols obtained or the mono or diacetates obtained therefrom by acetylation or other esters obtained by acylation or derivatives of the diols can be converted for example according to the process of patent application Serial No. 213,630 into unsaturated products. This takes place, for example, by splitting off of water, acetic acid or another acid. Thus water may be split off by heating in vacuo, or with the aid of, for example, dehydrated copper sulfate, mineral acids, formic acid, and the like. Acids may be split off in known manner by heating with strong alkali. Upon introduction of two double bonds into ring A, splitting off of the 10-methyl group by heat can take place with resulting aromatization of ring A.

The following examples illustrate the invention without limiting the same thereto:

Example 1

Cholestanone-(3)-diol-(4.5)

200 mg. of cholestenone were dissolved in 10 ccs. of ether and left for 15 hours at 20° C. with 0.3 cc. of hydrogen peroxide (30%) and 10 mg. of osmic acid in 1 cc. of ether. The reaction solution was evaporated in vacuum, without heating, completely to dryness and to the complete disappearance of the odour of osmic acid. Where brown coloured reaction products were thereby produced, they were taken up again in ether, the solution decolourised with a drop of perhydrol and evaporated. The colourless, immediately crystallising residue was recrystallised from dilute alcohol; in this manner the cholestanone-(3)-diol-(4.5) was obtained in leaflets of melting point 206–208° C., $[\alpha]_D^{22°}$: +43.8° (in chloroform). Yield 60%.

40 mg. of cholestanone-(3)-diol-(4.5) were dissolved in 2 ccs. of pyridine and at about 20° C. brought into reaction over 24 hours with 50 mg. of acetic anhydride. The 4-mono-acetate formed was precipitated with water, filtered off and after drying recrystallised from chloroform-alcohol. Melting point 225–227° C.

Example 2

Cholestanone-(3)-diol-(1.2)

200 mg. of $\Delta^1$-cholestenone were dissolved in 10 ccs. of ether, treated with 10 mg. of osmic acid in 1 cc. of ether and 0.4 cc. of hydrogen peroxide and the whole allowed to stand for 30 hours at about 20° C. The weakly brown coloured solution was decolourised by addition of a few drops of perhydrol. The ethereal solution was evaporated in vacuum, the residue washed with water and recrystallised from dilute acetone. The cholestanone-(3)-diol-(1.2) was obtained in lustrous leaflets which melt at 186–188° C. (uncorrected).

Example 3

Cholestandione-(3.6)-diol-(4.5)

200 mg. of 6-oxo-cholestenone ($\Delta^4$-cholestendione- (3.6) were dissolved in 10 ccs. of ether, treated with 10 mg. of osmic acid in 1 cc. of ether and 0.3 cc. of hydrogen peroxide (30%) and the whole allowed to stand over night at room temperature. The cholestandione-(3.6)-diol-(4.5) crystallized in practically quantitative yield from the reaction solution; a slight residue could further be obtained by evaporation of the solvent. The dihydroxy-diketone is difficultly soluble in ether, alcohol and acetone, from chloroform-alcohol it was obtained in feathered needles which slowly decompose above 200° C. and melt at 243–245° C. $[\alpha]_D^{21°}$: —15.6° (in chloroform).

85 mg. of cholestandione-(3.6)-diol-(4.5) were dissolved in 3 ccs. of pyridine and left to stand with 150 mg. of acetic anhydride for 24 hours at room temperature. By spraying with water the 4-mono-acetate was precipitated in crystalline form and recrystallised from dilute alcohol or chloroform-alcohol. Needles of melting point 224–226° C.

Example 4

Pregnandione-(3.20)-diol-(4.5)

100 mg. of progesterone (melting point 128° C.) were allowed to stand for 24 hours at room temperature in 10 ccs. of ether with 0.15 cc. of hydrogen peroxide (30%) and 6 mg. of osmic acid in 0.6 cc. of ether. The solvent was removed in vacuum without heating and the colourless crystalline residue recrystallised from chloroform-alcohol. The pregnandione-(3.20)-diol-(4.5) was obtained in the form of small octahedra. Melting point 249–250° C. (with decomposition $[\alpha]_D^{21°}$: +104.5° (in chloroform). Yield 30%.

50 mg. of pregnandione-(3.20)-diol-(4.5) were dissolved in 10 ccs. of pyridine and allowed to stand for 24 hours at room temperature with 60 mg. of acetic anhydride. The 4-mono-acetate was precipitated by addition of water and recrystallised from alcohol. It crystallised in fine needles of melting point 223–225° C.

Example 5

Androstanone-(3)-triol-(4.5.17)-monoacetate-(17)

530 mg. of testosterone acetate were dissolved in 15 ccs. of ether, treated with 12 mg. of osmic acid in 1.5 ccs. of ether and 1.2 ccs. of hydrogen peroxide (30%) and allowed to stand for 24 hours at room temperature. The occurrence of a brown coloration could be prevented by further addition of 1–2 drops of perhydrol. The reaction solution was evaporated in vacuum without heating, the residue washed with water and recrystallised from dilute acetone. The 17-acetate of the androstanone-(3)-triol-(4.5.17) was obtained in leaflets of melting point 185–188° C. Yield 450 mg. $[\alpha]_D^{21°}$: +35.7° (in chloroform).

The reaction product from 200 mg. of testosterone acetate was dissolved in 3 ccs. of pyridine and allowed to stand with 350 mg. of acetic anhydride for 24 hours at about 20° C. The 4.17-diacetate of androstanone-(3)-triol-(4.5.17) was precipitated with dilute sulphuric acid, recrystallised from dilute alcohol and dilute acetone and obtained in prismatic needles of melting point 220–222° C. (with decomposition).

What I claim is:

1. Process for the manufacture of compounds of the cyclopentano-polyhydrophenanthrene series, characterised in that compounds of the group of the $\alpha,\beta$-unsaturated 3-steroid ketones and their enol derivatives are oxidised with hydrogen peroxide in the presence of an approximately catalytic amount of osmium tetroxide, and the hydroxy compounds produced then isolated.

2. Process according to claim 1, characterised in that a $\Delta^{1,2}$-unsaturated 3-steroid ketone is employed as starting material.

3. Process according to claim 1, characterised in that a $\Delta^{4,5}$-unsaturated-3-steroid ketone is employed as starting material.

4. Process according to claim 1, characterised in that a $\Delta^{4,5}$-unsaturated-3.6-steroid diketones are employed as starting material.

5. Process according to claim 1, characterised in that a steroid compound of the group of the $\Delta^{1,2}$-cholestenone, $\Delta^{4,5}$-cholestendione-3.6, progesterone and testosterone acetate is employed as starting material.

6. Process according to claim 1, characterised in that the oxidation product is acylated.

7. Process according to claim 1, characterised in that the oxidation product is converted into an unsaturated di- or poly-oxo compound.

8. Process according to claim 1, characterised in that the oxidation product is treated with an agent which splits off water.

9. Process according to claim 1, characterised in that the oxidation product is acylated, and the acylated oxidation product treated with an agent which splits off acid.

10. Process according to claim 1, characterised in that the oxidation product is acetylated and thereupon treated with an agent which splits off acetic acid.

11. Process according to claim 1, characterised in that the oxidation product after conversion into an unsaturated di- or poly-oxo compounds in the manner known per se is aromaticised in ring A by removal of the methyl group from the 10-position.

12. Androstanone-3-triol-4.5.17.

13. Androstanone-3-ol-5 having in each of the 4 and 17-positions a member of the class consisting of hydroxyl and ester groups.

ADOLF BUTENANDT.